(No Model.) 2 Sheets—Sheet 2.
W. E. GETZS.
GYRATING BOLT.
No. 502,116. Patented July 25, 1893.
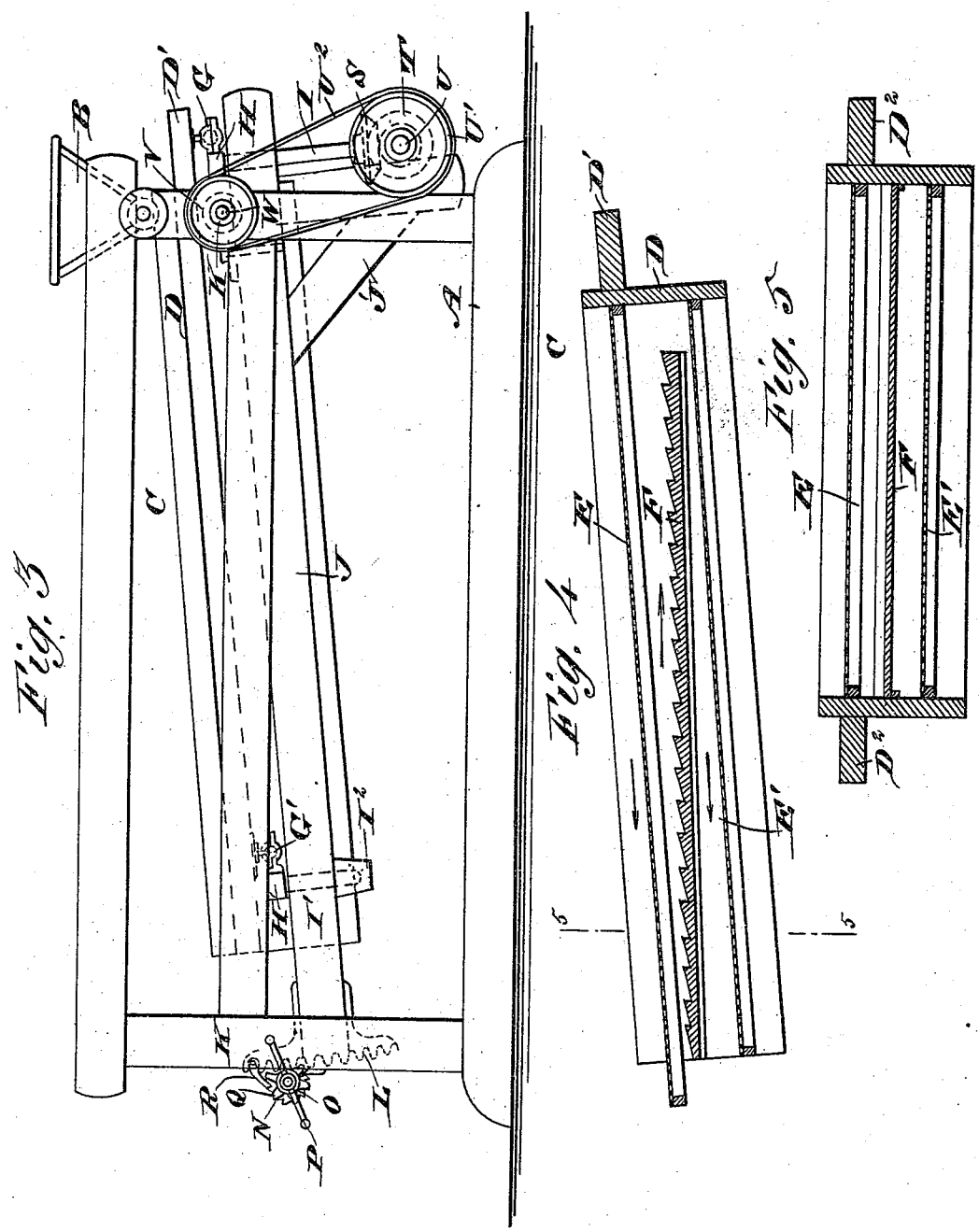
WITNESSES:
C. Naeux
C. Sedgwick
INVENTOR
W. E. Getzs
BY
Munn & Co
ATTORNEYS.

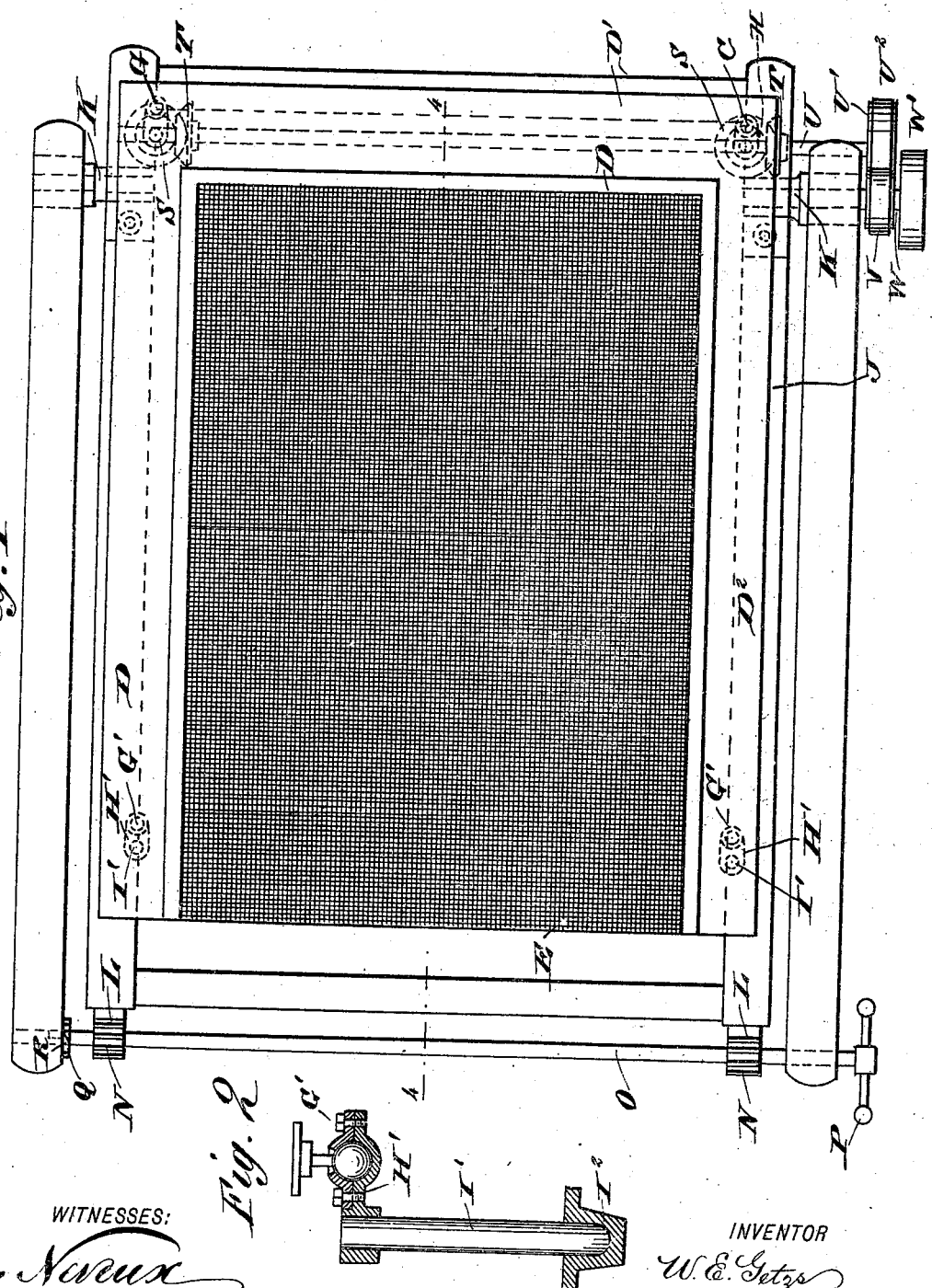

UNITED STATES PATENT OFFICE.

WILLIAM E. GETZS, OF QUINCY, ILLINOIS.

GYRATING BOLT.

SPECIFICATION forming part of Letters Patent No. 502,116, dated July 25, 1893.

Application filed June 25, 1892. Serial No. 437,941. (No model.)

*To all whom it may concern:*

Be it known that I, WILLIAM E. GETZS, of Quincy, in the county of Adams and State of Illinois, have invented a new and Improved Gyrating Bolt, of which the following is a full, clear, and exact description.

The invention relates to mills, and its object is to provide a new and improved gyrating bolt which is simple and durable in construction, very effective in operation and easily adjustable according to the nature of the material under treatment.

The invention consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a plan view of the improvement with the feed hopper removed. Fig. 2 is an enlarged sectional side elevation of the crank connection for the lower end of the sieve.
Fig. 3 is a side elevation of the improvement. Fig. 4 is a longitudinal section of the sieve on the line 4—4 of Fig. 1; and Fig. 5 is a transverse section of the same on the line 5—5 of Fig. 4.

The improved bolt is mounted on a suitably-constructed frame A, carrying at one end a feed hopper B, into which the material to be treated is placed to be fed by the hopper onto a sieve C, arranged within the frame and having a gyrating motion, as hereinafter more fully described. The sieve C extends in an inclined position from the hopper B, downwardly to the other end of the frame as will be readily understood by reference to Fig. 3.

The sieve C is provided with a suitably constructed frame D, containing one or a series of bolting cloths or nettings, preferably two, as shown in Figs. 4 and 5, the said bolting cloths E and E', being inclined and parallel to each other, and between the two is arranged a stepped partition F, inclined in an opposite direction to the bolting cloths E and E'. A suitable space is left at the lower end of the partition F, so that the material discharged from the latter can pass onto the upper end of the lowermost sieve E', see Fig. 4.

The bolting cloths E and E' are of a different degree of fineness, the upper cloth E, being the coarser one.

On the upper end of the frame D is arranged an outwardly-extending bar D', connected at its under side by two ball and socket joints G, with crank arms H, secured on the upper ends of shafts I, mounted to turn in suitable bearings formed in a frame J, hung on pivots K, secured to the upper posts of the frame A. On the sides of the sieve frame D are secured bars $D^2$, each pivotally-connected near its lower end by ball and socket joints G', with crank arms H', secured on shafts I', mounted at their lower ends in suitable sockets $I^2$ attached to the frame J. The shafts I and I' are mounted at right angles to the frame J, which latter is parallel to the sieve frame D. The lower end of the frame J is provided with racks L, engaging pinions N, secured on a transversely-extending shaft O, mounted to turn in suitable bearings arranged on the lower end posts of the frame A.

On one end of the shaft O is secured a suitable handle P, for conveniently turning the said shaft, so as to rotate the pinions N to raise and lower the racks L, thus imparting a swinging motion to the frame J to increase or decrease the inclination of the latter and consequently that of the sieve C. The shaft O is adapted to be locked in place, and for this purpose the shaft is provided with a ratchet wheel Q, engaged by a pawl R, pivoted on the frame A. Thus, when the desired position is obtained for the frame J, and the sieve C, the pawl R engaging the ratchet wheel Q, locks the several parts in the desired position. The lower ends of the shafts I on the upper end of the frame J carry bevel gear wheels S, in mesh with bevel gear wheels T, secured on a transversely extending shaft U, mounted to turn in suitable bearings attached to brackets J', projecting from the frame J.

On the outer end of the shaft U is secured a pulley U', connected by a belt $U^2$, with a pulley V, secured on a driving shaft W, mounted to turn in one of the pivots K for the frame J. On this shaft W is secured a pulley W', connected by a belt or other means with suitable machinery for imparting a rotary motion to the said shaft W, which latter, by the pulley V, the belt $U^2$ and pulley U' imparts a rotary motion to the shaft U and the latter by the gear wheels T and S revolves the shafts I. The crank arms H of the revolving shafts I impart a gyrating motion to the sieve C by means of the ball and socket joints G. As the crank arms H' on the sides of the sieve C are similar to the crank arms H, the desired gyrating motion is given to the sieve C, no matter what inclined position the latter is in. Now, it will be seen that when the frame J is raised or lowered it turns on the pivots K, one of which forms a bearing for the shaft W, so that the relative position of the shafts W and U is not disturbed, and the motion of the shaft W is transmitted to the shaft U as above described. It will further be seen that every point on the surface of the cloth gyrates in the same plane and the sieve itself gyrates in whatever inclined position it is, which inclined position, however, is regulated by the position of the frame J adapted to be swung into any desired inclination by the mechanism above described. It will be seen that the material passing onto the gyrating sieve C is first discharged onto the upper end of the upper bolting cloth E, down which the material passes, part of the material passing through the meshes onto the partition F, from which the material travels in an upward direction to be finally discharged onto the second bolting cloth E', at the upper end thereof. The material then again passes downward over the second bolting cloth E', the tailings being finally discharged at the lower end of the said second bolting cloth E'. It is understood that the tailings pass over the lower ends of the sieves to the floor while the material finally passing through the lower screen E' is preferably gathered in a suitable hopper (not shown) and located under the said screen E'. Now, it will be seen that the material passes evenly and uniformly down the bolting cloths in the sieve C without any tendency of the material to being thrown to one side of the sieve. It will further be seen that there is no tendency to throw any material out of contact with the sieve, as the gyrating motion takes place in the same plane in which the sieve is located, so that all the particles move in a general direction down the inclination of the sieve in lines parallel to the sides of the sieve. As an even and uniform gyrating motion is given to the sieve in the manner described, the material will be gently agitated without any tendency of throwing or passing it from the sieve, and consequently preventing the material from mixing so that it will settle the better and purer parts next to the bolting cloths or wires and allow it to pass through the sieve without any harsh or rough treatment. As there is no tumbling or wearing action on the material while under treatment better results are obtained than with the bolting reel.

Having thus fully described my invention, I claim as new and desire to secure by Letters Patent—

1. In a gyrating bolt the combination with a sieve of crank arms connected by ball and socket joints with the said sieve, shafts carrying the said crank arms and a frame in which the said shafts are journaled and means substantially as described for revolving the said shafts, substantially as shown and described.

2. In a gyrating bolt the combination with a pivoted frame and means for adjusting the inclination thereof; of shafts journaled in the said frame at right angles thereto, crank arms carried by the said shafts, ball and socket joints on the said crank arms and a sieve connected with the said ball and socket joints and extending parallel to the said frame, substantially as shown and described.

3. In a gyrating bolt, the combination with a pivoted frame and means for adjusting the inclination thereof; of shafts journaled in the said frame at right angles thereto, crank arms carried by the said shafts, ball and socket joints on the said crank arms, a sieve connected with the said ball and socket joints and extending parallel to the said frame, a driving shaft journaled in an extension of the said frame and gearing for connecting the said driving shaft with some of the said frame shafts to rotate the latter and thus impart a gyrating motion to the said sieve, substantially as shown and described.

4. In a gyrating bolt, the combination with a pivoted frame and means for adjusting the inclination thereof; of shafts journaled in the said frame at right angles thereto, crank arms carried by the said shafts, ball and socket joints on the said crank arms, a sieve connected with the said ball and socket joints and extending parallel to the said frame, a driving shaft journaled in an extension of the said frame and gearing for connecting the said driving shaft with some of the said frame shafts to rotate the latter and thus impart a gyrating motion to the said sieve, a pulley shaft arranged in axial line with the pivot for the said frame and pulleys and belting for connecting the said pulley shaft with the said driving shaft, substantially as shown and described.

W. E. GETZS.

Witnesses:
H. F. LUMMIS,
B. B. LUMMIS.